United States Patent [19]

Abe

[11] Patent Number: 5,627,807
[45] Date of Patent: May 6, 1997

[54] OPTICAL DISK APPARATUS WITH FOCUS BIAS MEANS

[76] Inventor: Tetsuya Abe, Sony Corporation 7-35 Kitashinagawa 6-chome, Shinagawa-Ku, Tokyo, Japan

[21] Appl. No.: 528,038

[22] Filed: Sep. 14, 1995

[30] Foreign Application Priority Data

Sep. 19, 1994 [JP] Japan .................................. 6-249921

[51] Int. Cl.$^6$ .................................................. G11B 7/095
[52] U.S. Cl. ............................... 369/44.29; 369/44.25; 369/54
[58] Field of Search ..................... 369/44.25, 44.35, 369/44.36, 44.41, 44.29, 44.13, 124, 44.34, 54; 250/201.5

[56] References Cited

U.S. PATENT DOCUMENTS

| | | | |
|---|---|---|---|
| 4,730,294 | 3/1988 | Funada | 369/44.35 |
| 5,109,367 | 4/1992 | Yoshikawa | 369/44.36 |
| 5,282,184 | 1/1994 | Takikita | 369/44.25 |
| 5,351,224 | 9/1994 | Nagata et al. | 369/44.29 |
| 5,475,664 | 12/1995 | Shimizume et al. | 369/44.29 |
| 5,607,157 | 8/1986 | Millar et al. | 369/44.13 |

Primary Examiner—Thang V. Tran

[57] ABSTRACT

An optical disk apparatus with a focus bias circuit including a focus servo device for an optical pickup, wherein a return light beam from an optical disk is received by a photo detector, then a focus error signal is detected from the outputs of divided sensors of the photo detector, and focus servo control is executed by applying a focus bias from a focus bias generator circuit to the focus error signal. The apparatus comprises an extractor for extracting a traverse level of a tracking error signal computed on the basis of the outputs of the sensors while changing the focus bias in an off-state of the tracking servo; a computer circuit for obtaining a focus bias corresponding to the maximum value of the traverse level extracted by the extractor; and a controller for controlling the focus bias generator circuit in such a manner as to attain a coincidence between the output thereof and the focus bias obtained from the computer circuit. In this apparatus, the focus bias can always be adjusted to an optimal value thereof and the production cost is reducible with a simplified structure.

7 Claims, 4 Drawing Sheets

F I G. 3A
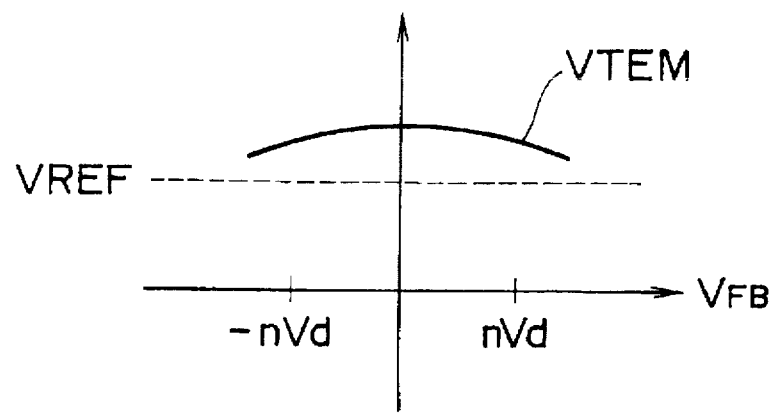
F I G. 3B
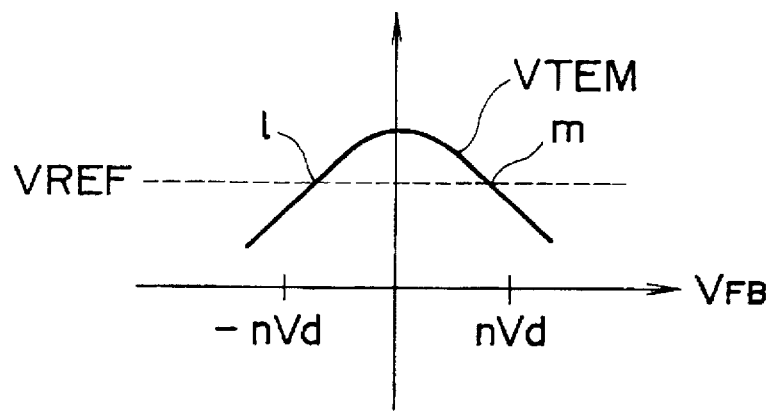
F I G. 3C
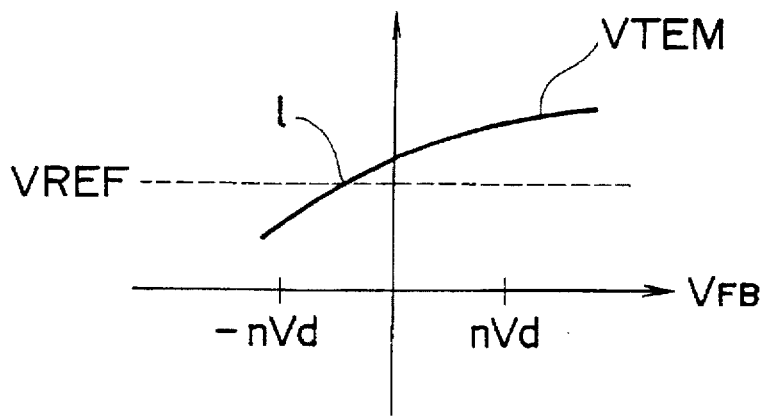

OPTICAL DISK APPARATUS WITH FOCUS BIAS MEANS

BACKGROUND OF THE INVENTION

1. Field of the Invention

The present invention relates to an optical disk apparatus equipped with a focus bias means to execute focus servo control by applying a focus bias from a focus bias generator circuit to a focus error signal in an operation of recording data on and/or reproducing the same from an optical disk such as a compact disk, a magneto-optical disk or the like used for data storage and so forth.

2. Description of the Related Art

In the optical disk apparatus known heretofore, it is customary to execute the following servo control.

For example, a light beam emitted from a light source is irradiated to the surface of an optical disk, and a return light beam from the optical disk is received by a photo detector.

A focus error signal and a tracking error signal are detected on the basis of the outputs of focus sensors which are divisions of the photo detector.

The focus error signal and the tracking error signal thus detected are supplied to a focus servo circuit and a tracking servo circuit respectively, thereby executing focus servo control and tracking servo control.

FIG. 1 shows an exemplary structure of such optical disk apparatus.

In FIG. 1, the optical disk apparatus 1 comprises an optical pickup 2, and a tracking servo circuit 5 and a focus servo circuit 6 which receive, via amplifiers 3 and 4 respectively, a tracking error signal and a focus error signal obtained on the basis of the difference between the light quantities of individual light receiving elements of a photo detector in the optical pickup 2.

The optical disk apparatus 1 further comprises a tracking driver 7 for driving an actuator of the optical pickup 2 under control on the basis of a servo signal from the tracking servo circuit 5 to thereby move an objective lens in the tracking direction, a focus driver 8 for driving the actuator of the optical pickup 2 under control on the basis of a servo signal from the focus servo circuit 6 to thereby move the objective lens in the focusing direction, and an adding circuit 9a for applying a focus bias, which is obtained from the focus bias generator circuit 9, to the focus error signal outputted from the amplifier 4.

The optical pickup 2 has a known structure wherein an objective lens (not shown) is held to be movable biaxially, so that when a tracking coil and a focus coil provided in the actuator are fed with current, the objective lens can be driven biaxially under control in both of the tracking and focusing directions.

The tracking servo circuit 6 is supplied with the tracking error signal obtained from the optical pickup 2 and amplified by the amplifier 3, and then outputs a tracking control signal to the driver 7 in accordance with the tracking error signal so as to minimize the tracking error.

The focus servo circuit 6 is supplied with the focus error signal obtained from the optical pickup 2 and amplified by the amplifier 4, and then outputs a focus control signal to the driver 8 in accordance with the focus error signal so as to minimize the focus error.

The driver 7 serves to drive the actuator of the optical pickup 2 in response to the tracking control signal received from the tracking servo circuit 5, thereby moving the objective lens in the tracking direction to minimize the tracking error.

Meanwhile the driver 8 serves to drive the actuator of the optical pickup 2 in response to the focus control signal received from the focus servo circuit 6, thereby moving the objective lens in the focusing direction to minimize the focus error.

Since the minimum point of the focus error signal may sometimes fail to coincide with the least jitter point of a reproduced signal, a focus bias obtained from the focus bias generator circuit 9 is applied to the focus error signal for causing the minimum point of the focus error signal to coincide with the least jitter point of a reproduced signal.

In the optical disk apparatus 1 of the structure mentioned above, the focus bias is adjusted in the following manner.

At the time of assembling the optical disk apparatus 1, focusing is performed in an on-state of the focus servo, and an adjusting rheostat 9b incorporated in the focus bias generator circuit 9 is manually operated while observing the RF signal from the optical pickup 2 and monitoring the value of the jitter, whereby an optimal focus bias is determined with respect to the individual optical disk device 1.

However, in the optical disk apparatus of the above structure, a tact time required for determining the focus bias is long with another disadvantage of necessitating the adjusting rheostat 9b, hence raising a problem of higher cost with regard to the component parts.

Further in an operation of recording data on and/or reproducing the same from an optical disk, the refractive index of the optical disk to an incident light beam is rendered different if the material of the disk is different, so that the incident light quantity of the return light beam to the photo detector may also be changed. In addition, occurrence of ambient temperature fluctuation brings about some harmful influence inclusive of a positional deviation of the objective lens due to the resultant temperature fluctuation in the apparatus.

Consequently, it becomes difficult to adjust the focus bias exactly to its optimal value in reproduction of data from the optical disk.

SUMMARY OF THE INVENTION

It is therefore an object of the present invention to provide an optical disk apparatus with a focus servo device wherein a focus bias can always be adjusted to an optimal value thereof and the production cost is reducible with a simplified structure.

According to the present invention, the above object is achievable by an optical disk apparatus with a focus bias means including a focus servo device for an optical pickup, wherein a return light beam from an optical disk is received by a photo detector, then a focus error signal is detected from the outputs of divided sensors of the photo detector, and a focus bias outputted from a focus bias generator circuit is applied to the focus error signal to thereby execute focus servo control. The optical disk apparatus comprises an extractor means for extracting, in an off-state of the tracking servo, a traverse level of a tracking error signal computed on the basis of the outputs of the sensors while changing the focus bias; a computer circuit for obtaining a focus bias corresponding to the maximum value of the traverse level extracted by the extractor means; and a control means for controlling the focus bias generator circuit in such a manner as to attain a coincidence between the output thereof and the focus bias obtained from the computer circuit.

Here, the traverse level signifies the peak-to-peak value of a traverse signal based on the tracking signal obtained when the optical pickup traverses the track on the optical disk.

The above and other features and advantages of the present invention will become apparent from the following description which will be given with reference to the illustrative accompanying drawings.

BRIEF DESCRIPTION OF DRAWINGS

FIGS. 3A to 3C graphically show the relationship between a focus bias and a traverse level in the focus servo device in FIG. 2.

DESCRIPTION OF PREFERRED EMBODIMENT

Hereinafter a preferred embodiment of the present invention will be described in detail with reference to the accompanying drawings of FIGS. 2 through 4.

It is to be understood that the following embodiment represents merely a preferred concrete example of the present invention with a variety of technically preferable restrictions annexed thereto, but the scope of the invention is not limited to such embodiment alone unless any specific restriction is given in the explanation below.

Figure 1:
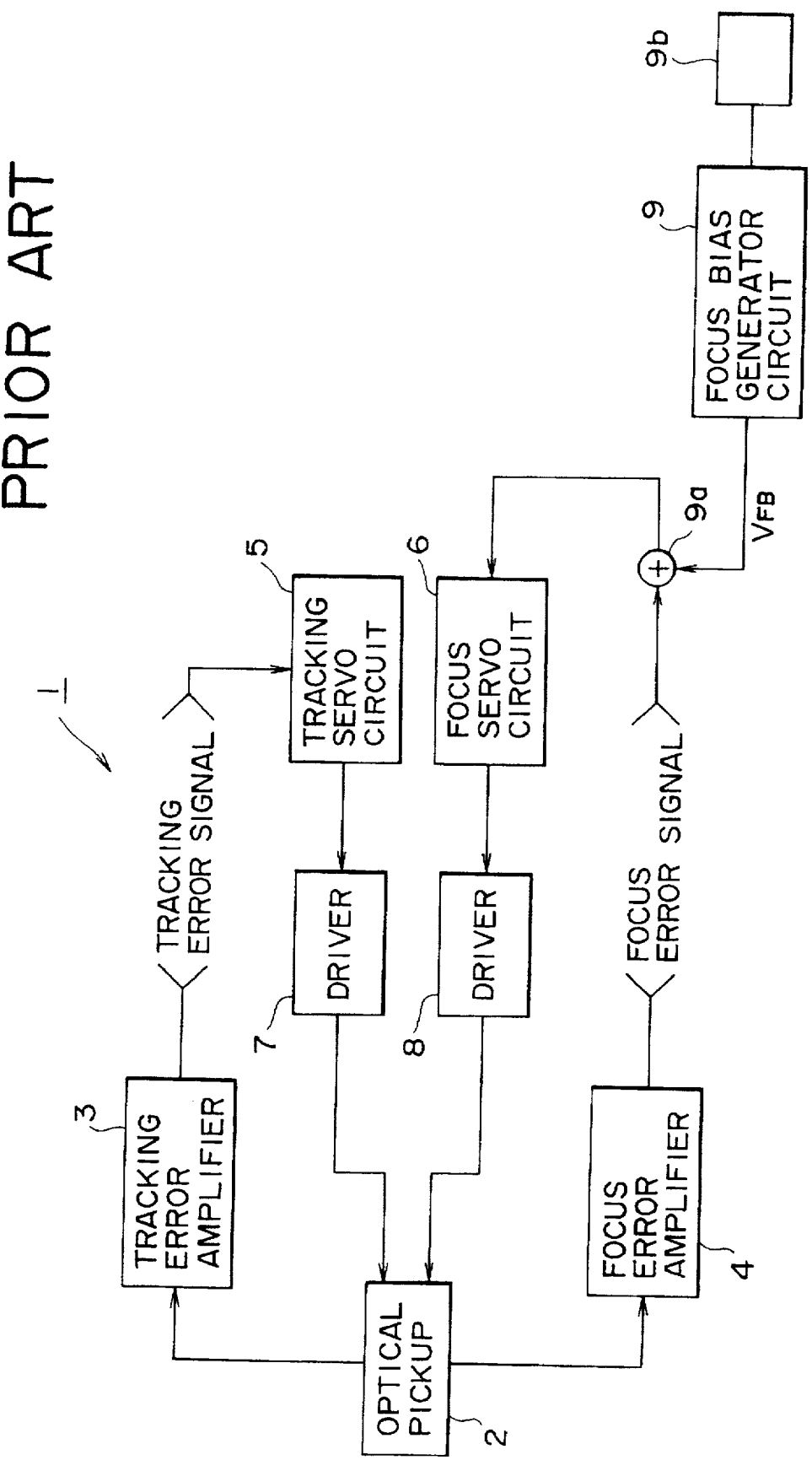
FIG. 1 is a block diagram showing a conventional optical disk apparatus in the related art.
Figure 2:
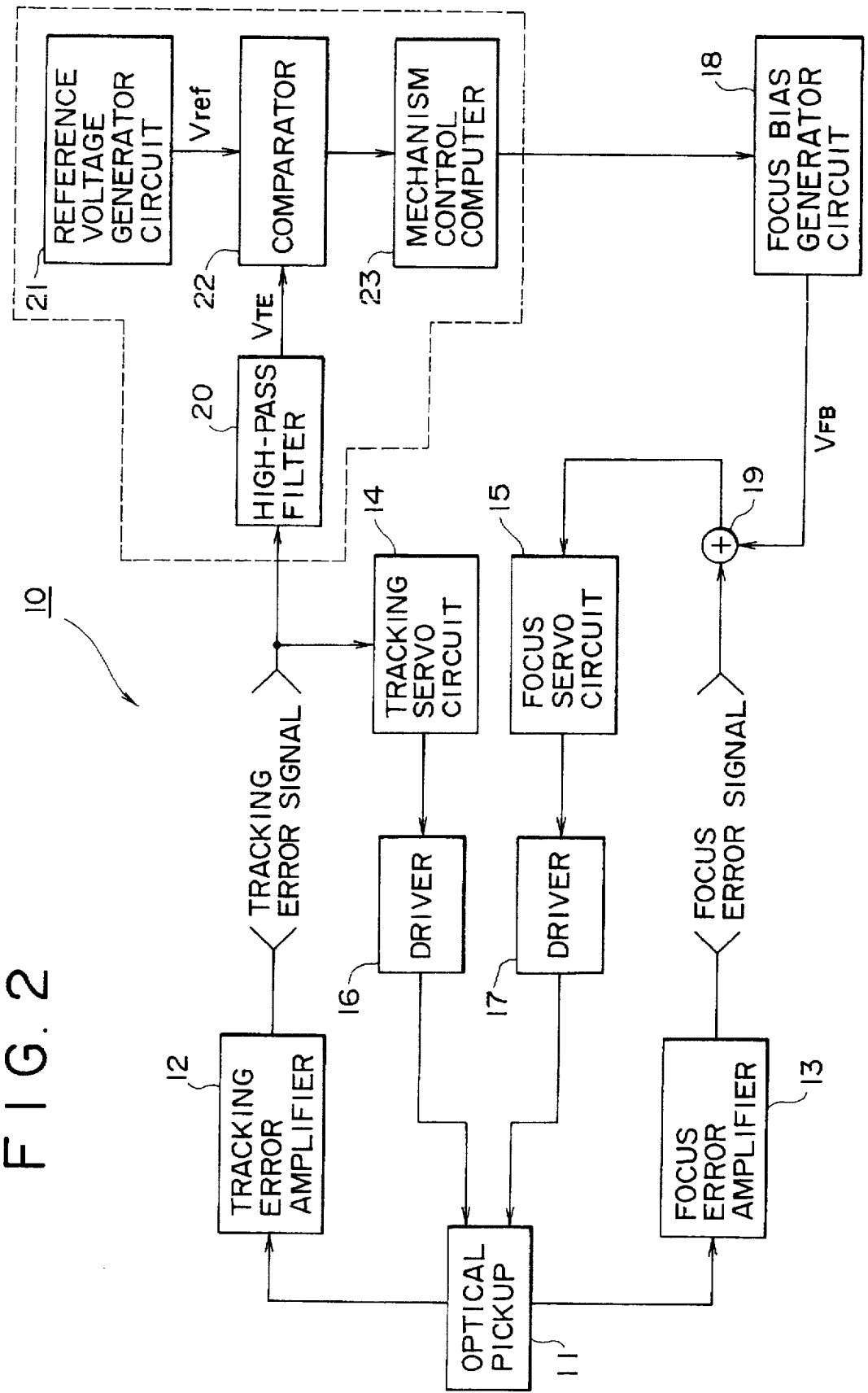
FIG. 2 is a block diagram showing an embodiment of the optical disk apparatus of the invention where a focus servo device is incorporated.

FIG. 2 shows a preferred embodiment of an optical disk apparatus of the present invention with a focus servo device incorporated therein.

In FIG. 2, the optical disk apparatus 10 comprises an optical pickup 11, and a tracking servo circuit 14 and a focus servo circuit 15 which receive, via amplifiers 12 and 13 respectively, a tracking error signal and a focus error signal obtained on the basis of the difference between the light quantities of individual light receiving elements of a photo detector in the optical pickup 11.

The optical disk apparatus 10 further comprises a tracking driver 16 for driving an actuator of the optical pickup 11 under control on the basis of a servo signal from the tracking servo circuit 14 to thereby move an objective lens in the tracking direction, a focus driver 17 for driving the actuator of the optical pickup 11 under control on the basis of a servo signal from the focus servo circuit 15 to thereby move the objective lens in the focusing direction, and an adding circuit 19 for applying a focus bias, which is obtained from a focus bias generator circuit 18, to the focus error signal outputted from the amplifier 13.

The optical pickup 11 has a known structure wherein an objective lens (not shown) is held to be movable biaxially, so that when a tracking coil and a focus coil provided in the actuator are fed with current, the objective lens can be driven biaxially under control in both of the tracking and focusing directions.

The tracking servo circuit 14 is supplied with the tracking error signal obtained from the optical pickup 11 and amplified by the amplifier 12, and then outputs a tracking error control signal to the driver 16 in accordance with the tracking error signal so as to minimize the tracking error.

The focus servo circuit 15 is supplied with the focus error signal obtained from the optical pickup 11 and amplified by the amplifier 13, and then outputs a focus control signal to the driver 17 in accordance with the focus error signal so as to minimize the focus error.

The driver 16 serves to drive an actuator of the optical pickup 11 in response to the tracking control signal received from the tracking servo circuit 14, thereby moving the objective lens in the tracking direction (the diametrical direction of the disk) to minimize the tracking error.

Meanwhile the driver 17 serves to drive the actuator of the optical pickup 11 in response to the focus control signal received from the focus servo circuit 15, thereby moving the objective lens in the focusing direction (the optical axis direction) to minimize the focus error.

The focus bias generator circuit 18 generates a focus bias VFB which is applied to the focus error signal to attain a coincidence between the minimum point of the focus error signal and the least point of the jitter when such two points are not coincident with each other.

The optical disk apparatus 10 further comprises a high-pass filter 20 to which the tracking error signal from the amplifier 12 is inputted, a comparator 22 for comparing an output signal of the high-pass filter 20 with a reference value outputted from a reference voltage generator circuit 21, and a mechanism control computer 23 for changing the focus bias, which is obtained from the focus bias generator circuit 18, in accordance with the output signal of the comparator 22.

The high-pass filter 20 passes any signal component over a predetermined frequency, and outputs a traverse level VTE by taking the peak-to-peak value (traverse level) of a traverse signal produced through extraction of the AC component from the tracking error signal.

The reference voltage generator circuit 21 outputs a reference voltage VREF adjusted to a predetermined voltage. The reference voltage VREF is determined on the basis of the jitter range which is tolerable in obtaining a reproduced signal.

The comparator 22 compares the traverse level VTE with the reference voltage VREF and outputs, e.g., a high (H) level signal when the traverse level VTE is above the reference voltage VREF, or outputs, e.g., a low (L) level signal when the traverse level VTE is below the reference voltage VREF.

The mechanism control computer 23 controls the focus bias generator circuit 18 to change the voltage difference Vd of the focus bias VFB in a range from −nVd to +nVd (where n is an integer). Consequently, the focus bias VFB is expressed as $$VFB = k \cdot Vd \qquad (1)$$

where k is an integer. In conformity with changes of k from −n to +n, the focus bias VFB is changed stepwise from −nVD to +nVD. Each value of −n through n is selectively set within a range where, when the focus bias corresponding thereto is applied to the focus servo circuit 15 via the focus bias generator circuit, the focus servo control is still retained.

The relationship between the reference voltage VREF and the traverse level, which is the maximum value VTEM of the tracking error signal caused with such changes of the focus bias VFB, is classified into three cases as graphically shown in FIGS. 3A to 3C. In each of such graphs representing the three cases, the ordinate and the abscissa denote the voltage and the focus bias, respectively.

1. The maximum value VTEM is always greater than the reference voltage VREF (FIG. 3A).

2. The maximum value VTEM is smaller than the reference voltage VREF when the focus bias VFB is low and becomes greater than the reference voltage VREF halfway, or is smaller than the reference voltage VREF when the focus bias VFB is high (FIG. 3B).
3. The maximum value VTEM is smaller than the reference voltage VREF when the focus bias VFB is low, and becomes greater than the reference voltage VREF halfway (FIG. 3C).

In view of the above, adjustment of the focus bias in the optical disk apparatus 10 is performed as follows in accordance with a flow chart of FIG. 4.

Figure 4:
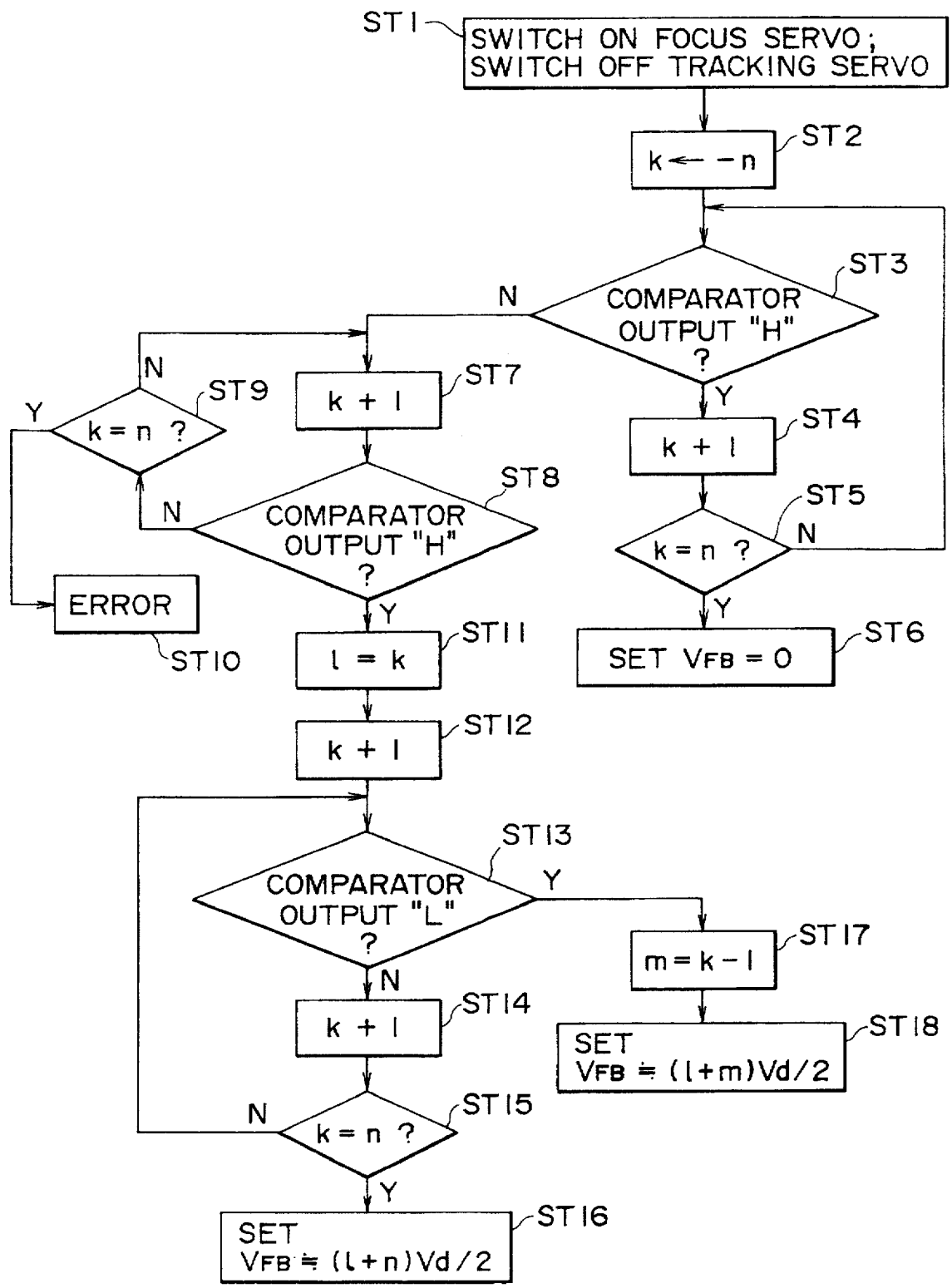
FIG. 4 is a flow chart for explaining an operation of determining the focus bias in the focus servo device shown in FIG. 2.

First at step ST1 in FIG. 4, the focus servo is switched on while the tracking servo is switched off (ST1). Then at step ST2, the focus bias generator circuit 18 is controlled by the mechanism control computer 23 in such a manner that integers ranging from −n are substituted sequentially for the value of k which determines the focus bias VFB (ST2), and the operation proceeds to step ST3.

At step ST3, the comparator 22 compares the traverse level VTEM, which corresponds to the value of k determined at step ST2, with the reference voltage VREF obtained from the reference voltage generator circuit 21, and a decision is made as to whether the traverse level VTEM is higher or not than the reference voltage VREF. If the result of such a decision is affirmative (Yes), the operation proceeds to step ST4, where 1 is added sequentially to the value of k, and the above comparison at step ST3 is repeated until the value of k becomes equal to the value of n (ST5).

Consequently, when the traverse level VTEM is higher than the reference voltage VREF over the entire range of k from −n to n, the mechanism control computer 23 regards it as the case of FIG. 3A and sends an instruction to the focus bias generator circuit 18 for setting the focus bias VFB to zero correspondingly to the maximum value of the traverse level VTEM.

If the result of the decision at step ST3 is negative (No), 1 is added sequentially to the value of k (ST7) and, until k becomes equal to n, a decision is made repeatedly in the mechanism control computer 23 as to whether the output of the comparator 22 is turned to a high (H) level or not (ST8 and ST9). At step ST9, if the traverse level VTEM is lower than the reference voltage VREF when the value of k is within a range from −n to n, the result indicates an error since it belongs to none of the three cases of FIGS. 3A to 3C (ST10).

Meanwhile, if the result of the decision obtained at step ST8 is affirmative (Yes) in the process of adding an integer sequentially to k, the value of k at that time is expressed as ι, which is then stored in a memory incorporated in the mechanism control computer 23 (ST11). And thereafter the value of k is further increased by 1 sequentially (ST12).

Subsequently the mechanism control computer 23 makes a decision as to whether the output of the comparator 22 is turned to a low (L) level or not (ST13). And if the result of this decision is negative (No), the operation proceeds to step ST14 where the value of k is increased by 1 sequentially, and the decision at step ST13 is repeated until the value of k becomes equal to the value of n.

In this process, if the result of the decision at step ST13 is affirmative (Yes) which signifies that the traverse level VTEM is lower than the reference voltage VREF, the mechanism control computer 23 regards it as the case of FIG. 3B, and the value of k−1 at that time is expressed as m, which is then stored in the memory incorporated in the control computer 23 (ST17).

In this case, the curve representing the traverse level VTEM is an upwardly convex parabola, as shown in FIG. 3B. Then, there is calculated the average of the value m and the value ι corresponding to the point where the traverse level VTEM is substantially coincident with the reference voltage VREF, so that the mechanism control computer 23 can select the maximum value on the curve of the traverse level VTEM or a point corresponding thereto. Accordingly, a focus bias corresponding to the average of the two values ι and m is supplied to the focus bias generator circuit 18 (ST18). The reason for subtracting 1 from the value m is based on the fact that, in case k denotes the value smaller by 1 than the value m at the intersection of the curve representing the traverse level VTEM and the reference voltage VREF, the traverse level VTEM corresponding to k is always higher than the reference voltage VREF.

Meanwhile, if the traverse level VTEM is still higher than the reference voltage VREF even when k has become equal to n after sequential increase of k during the process of steps ST13 to ST15, the mechanism control computer 23 regards it as the case of FIG. 3C.

In this case, the traverse level VTEM is always higher than the reference voltage level VREF despite the sequential increase of k beyond the value of ι. For this reason, the mechanism control computer 23 selects a value of n greater than ι, then considers the average of the two values ι and n as the maximum value of the traverse level VTEM, and supplies a focus bias, which corresponds to the average of the two values ι and n, to the focus bias generator circuit 18 (ST16).

In the above description, ι indicates the value of k that causes the traverse level VTEM to be greater than the reference voltage VREF, and (m+1) indicates the value of k that causes the traverse level VTEM to be smaller than the reference voltage VREF. More specifically, in the flow chart of FIG. 4, ι is obtained at steps ST7 through ST11, and m is obtained at steps ST12 through ST17.

Due to such construction, it becomes possible to simply calculate the maximum traverse level or the value corresponding thereto, and further to calculate, in accordance with the above value, the optimal focus bias that minimizes the jitter.

Thus, in the embodiment mentioned, a traverse level is extracted from a tracking error signal by the extractor means during an off-time of the tracking servo, then a focus bias corresponding to the maximum value of such traverse level is obtained by the computer circuit, and the focus bias generator circuit is controlled by control means in such a manner as to optimize the focus bias. Accordingly, the focus bias is so adjusted as to attain a coincidence between the minimum point of the focus error signal and the least point of the jitter.

Consequently, adjustment of the focus bias can be performed whenever the tracking servo is in its off-state, so that the focus bias is adjustable even during use of the optical disk apparatus in addition to the time of its assembly. Since the focus bias can be adjusted at the start of a data recording/reproducing operation on an optical disk, it is possible to adjust and optimize the focus bias for each of individual optical disks despite any difference of the material thereof. And even when there occurs some ambient temperature fluctuation, the focus bias is retained to be optimal due to the proper adjustment.

Furthermore, as the focus bias is adjusted by the control circuit, an adjusting rheostat needed heretofore in the prior art is no longer necessary, hence realizing a reduction in the cost of component parts.

When the extractor means is a high-pass filter for extracting the AC component from the input tracking error signal, a simple structure is sufficient to extract the traverse level from the tracking error signal, thereby curtailing the production cost.

Although the present invention has been described hereinabove with reference to the preferred embodiment thereof, it is to be understood that the invention is not limited to such embodiment alone, and a variety of other modifications and variations will be apparent to those skilled in the art without departing from the spirit of the invention.

The scope of the invention, therefore, is to be determined solely by the appended claims.

What is claimed is:

1. An optical disk apparatus with a focus bias means including a focus servo device for an optical pickup, wherein a return light beam from an optical disk is received by a photo detector, then a focus error signal is detected from the outputs of divided sensors of said photo detector, and focus servo control is executed by applying a focus bias from a focus bias generator circuit to the focus error signal, said optical disk apparatus comprising:

an extractor means for extracting a traverse level of a tracking error signal computed on the basis of the outputs of said sensors while changing the focus bias in an off-state of the tracking servo;

a computer circuit for obtaining a focus bias adjustment corresponding to the maximum value of the traverse level extracted by said extractor means; and a control means for controlling said focus bias generator circuit to adjust said focus bias in accordance with said focus bias adjustment obtained from said computer circuit.

2. The optical disk apparatus according to claim 1, wherein said extractor means includes a high-pass filter for extracting the AC component of the tracking error signal.

3. The optical disk apparatus according to claim 2, wherein said computer circuit determines the focus bias adjustment in accordance with the traverse level based on the AC component of the tracking error signal extracted through said high-pass filter, and with a reference voltage corresponding to a reference level obtained from a reference voltage generator circuit.

4. The optical disk apparatus according to claim 1, wherein said computer circuit first compares a reference level, which is slightly lower than the maximum value of the traverse level, with said traverse level to thereby obtain one value of the traverse level substantially equal to the reference level, then calculates the average of said one value of the traverse level and an arbitrary value of the traverse level higher than said reference level, and determines the focus bias adjustment, which corresponds to said average, as the one to give the maximum value of the traverse level.

5. The optical disk apparatus according to claim 1, wherein said computer circuit compares a reference level, which is slightly lower than the maximum value of the traverse level, with said traverse level to thereby obtain two values of the traverse level substantially equal to the reference level, and determines the focus bias adjustment, which corresponds to the average of the two values of the traverse level, as the one to give the maximum value of the traverse level.

6. A method for controlling an optical disk system which includes a focus servo device for an optical pickup, wherein a return light beam from an optical disk is received by a photo detector, then a focus error signal is detected from the outputs of divided sensors of said photo detector, and focus servo control is executed by applying a focus bias from a focus bias generator circuit to the focus error signal, said method comprising the steps of:

extracting a traverse level of a tracking error signal computed on the basis of the outputs of said sensors while changing the focus bias in an off-state of the tracking servo;

obtaining a focus bias adjustment corresponding to the maximum value of the extracted traverse level; and adjusting said focus bias in accordance with said focus bias adjustment.

7. The method according to claim 6 further comprising the step of extracting the AC component of the tracking error signal.

* * * * *

UNITED STATES PATENT AND TRADEMARK OFFICE
CERTIFICATE OF CORRECTION

PATENT NO. : 5,627,807
DATED : May 6, 1997
INVENTOR(S) : ABE

It is certified that error appears in the above-indentified patent and that said Letters Patent is hereby corrected as shown below:

On the cover page, at item [73], please add --Assignee:

Sony Corporation, Tokyo, Japan--.

under item [56] Attorney, Agent & Firm, insert attorney name -- William S. Frommer --.

Signed and Sealed this

Twenty-second Day of July, 1997

Attest:

BRUCE LEHMAN

*Attesting Officer*           *Commissioner of Patents and Trademarks*